United States Patent [19]

Hautemont

[11] Patent Number: 4,462,952
[45] Date of Patent: Jul. 31, 1984

[54] MOLD POSITIONING METHOD AND APPARATUS

[75] Inventor: Jean-Claude H. Hautemont, Gif-sur-Yvette, France

[73] Assignee: Societe Anonyme dite: Etude et Realisation de Chaines Automatiques ERCA, Orsay, France

[21] Appl. No.: 441,302

[22] Filed: Nov. 12, 1982

[51] Int. Cl.³ ............................................. B29C 1/00
[52] U.S. Cl. ................................... 264/509; 264/516; 425/117; 425/125; 425/126 R; 425/127; 425/150
[58] Field of Search ............... 425/110, 117, 503, 504, 425/125, 127, 135, 145, 150, 522, 126 R; 264/509, 516

[56] References Cited

U.S. PATENT DOCUMENTS

| | | | |
|---|---|---|---|
| 3,827,128 | 8/1974 | Nasica | 264/516 |
| 4,355,967 | 10/1982 | Hellmer | 425/503 |
| 4,397,625 | 8/1983 | Hellmer et al. | 264/509 |

*Primary Examiner*—Willard E. Hoag
*Attorney, Agent, or Firm*—Charles E. Brown

[57] ABSTRACT

This relates to the mounting of a mold for movement between a forming position wherein a cup or container is formed therein with there being simultaneously applied to the formed cup a label, and a remote position wherein the mold receives a label. In the normal operation of the mold it is necessary that the mold be first moved axially to clear the newly formed cup and then pivoted to one side to a label receiving position for receiving the label. This particularly relates to the return movement of the mold from the label receiving position to the forming position wherein the movement is effected in a single step with the movement being a compound movement instead of the straight line movement followed by a pivotal movement of the mold as it moves from the forming position to the label receiving position thereby eliminating one separate movement step and thereby greatly reducing the time required to effect movement of the mold from the label receiving position to the operating position. This abstract forms no part of the specification of this application and is not to be construed as limiting the claims of the application.

11 Claims, 7 Drawing Figures

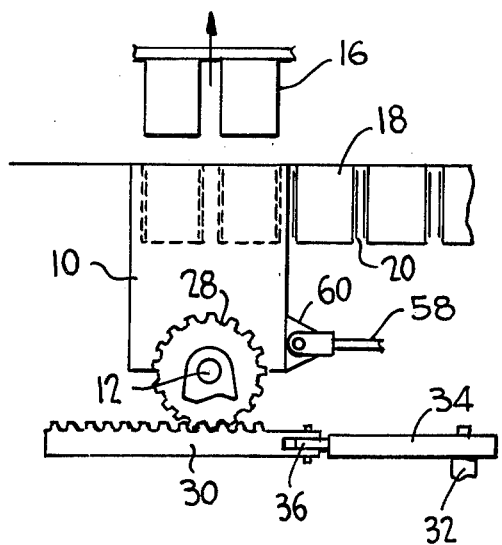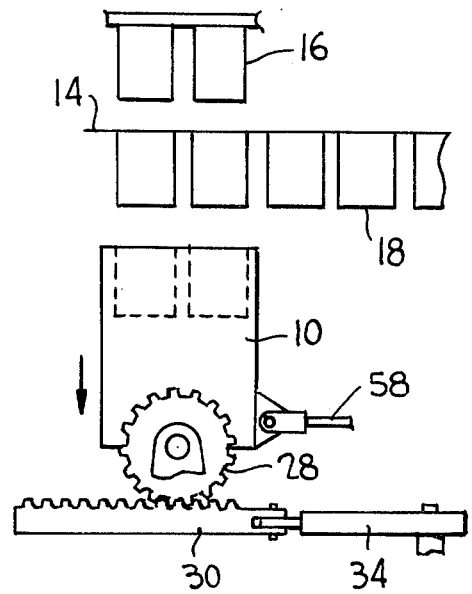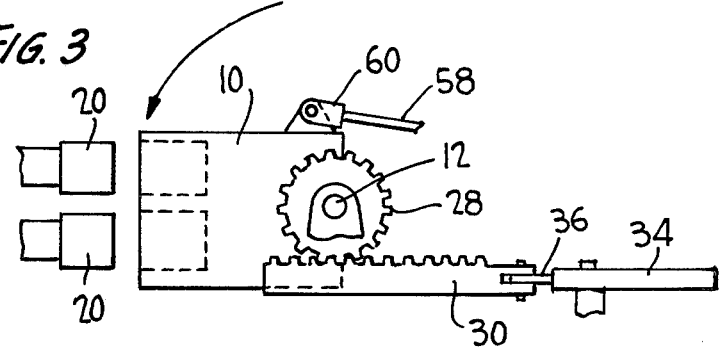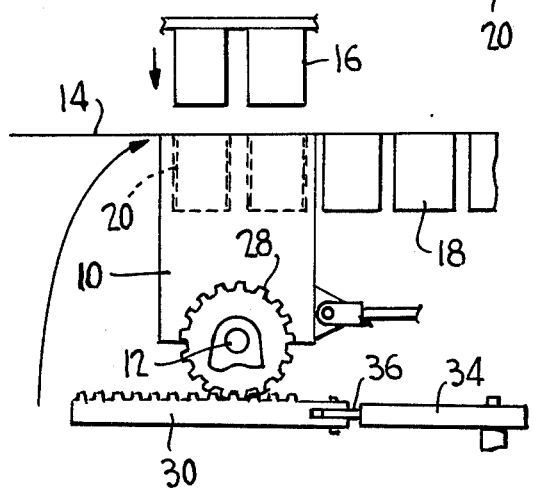

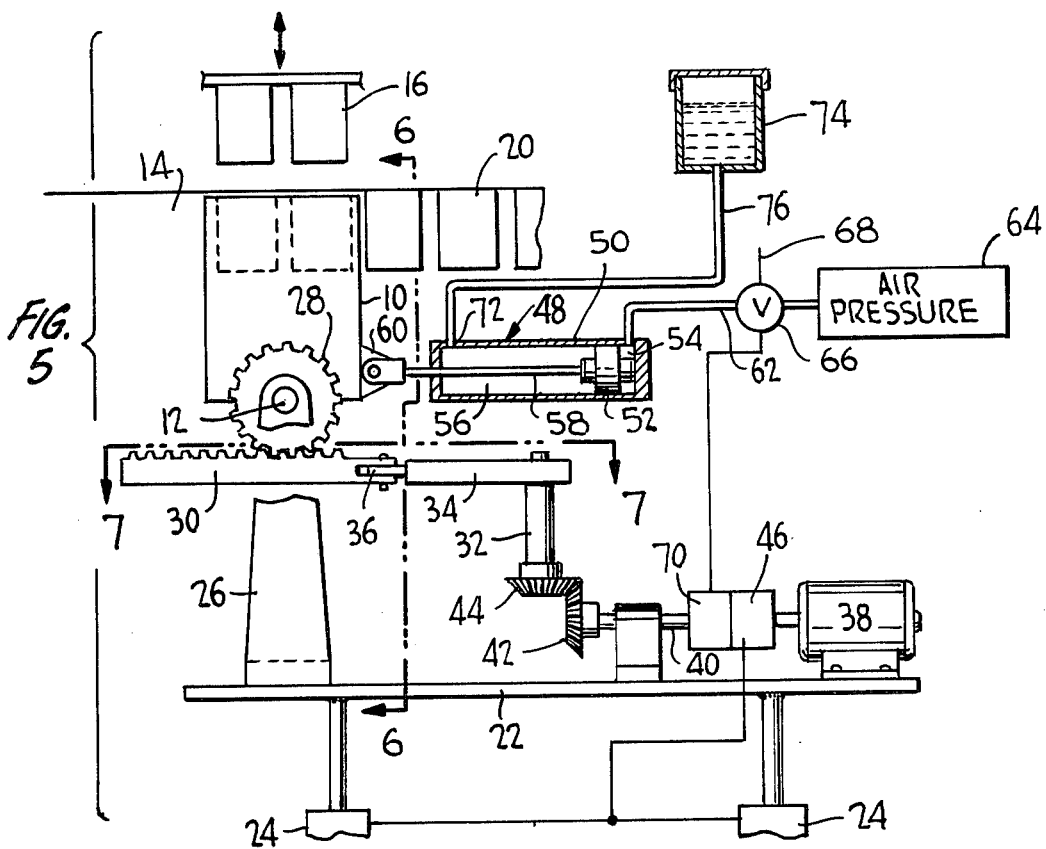
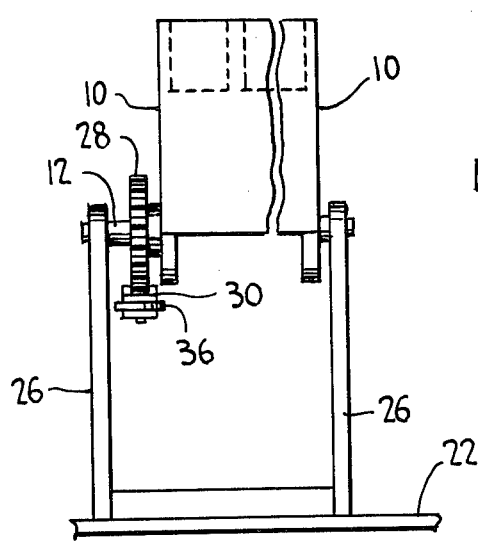
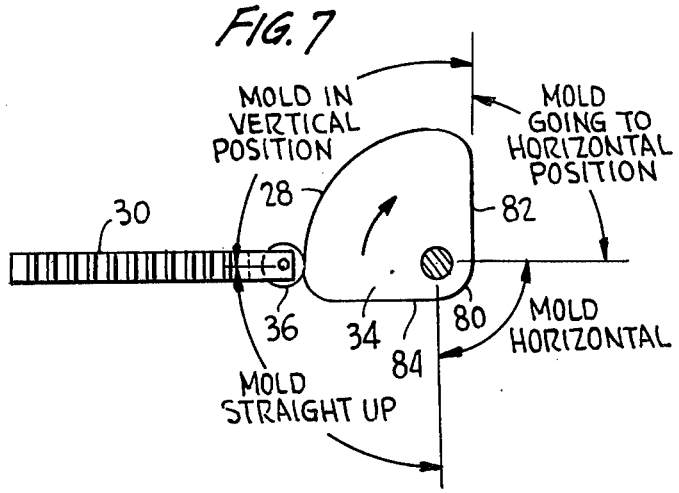

MOLD POSITIONING METHOD AND APPARATUS

This invention relates to an apparatus wherein a web is formed within a mold to define cups or containers and wherein the mold has previously deposited therein a label which becomes an integral part of the cup or container. The invention particularly relates to the positioning of the mold for the forming of the cup and the positioning of the mold for receiving a label and mechanism for effecting such positioning and the movement of the mold between the forming position and the label receiving position and return.

In the past, the mold has been moved axially of the mold cavity to separate the mold from the newly formed cup, then rotated to a label receiving position, then, after receiving a label, is rotated in the reverse direction after which it is again moved axially, but in the opposite direction, back to the forming position. It is to be understood that during the movement of the mold as thus described, the web from which the cup has been formed is advanced and that the time required to advance the web to present a new web section to the mold is much less than that required to move the mold to the label receiving position and return. Thus, time required for the movement of the mold to receive the label and return is a critical factor in the production rate of the apparatus.

In accordance with this invention, the mold is first moved axially to clear the newly formed cup and then pivoted or rotated to the label receiving position as occured in the past. However, the return movement is a single compound movement as opposed to the prior two-step return movement so that, during the time the mold is being pivoted in the return direction, it is also being moved axially so that the time previously required to effect the return axial movement of the mold is eliminated, thus greatly advancing the rate of production of the apparatus.

In accordance with this invention, the mold and the apparatus for effecting pivoting of the mold are mounted on a common support which is movable axially. Thus, it is possible to effect the aforementioned compound movement as well as the initial separate axial displacement of the mold and then rotation of the mold.

In accordance with this invention, there is provided a rack and pinion apparatus for effecting rotation or pivoting of the mold and the position of the rack is controlled by a cam which constantly rotates and is provided with a constant radius dwell for each of the forming position and the label receiving position.

With the above and other objects in view that will hereinafter appear, the nature of the invention will be more clearly understood by reference to the following detailed description, the appended claims, and the several views illustrated in the accompanying drawings.

IN THE DRAWINGS:

FIG. 1 is a schematic side elevational view showing the mold in its forming position and having formed therein a cup.

FIG. 2 is a schematic side elevational view similar to FIG. 1, and shows the mold moved axially so as to separate the mold from the newly formed cup.

FIG. 3 is another schematic side elevational view similar to FIG. 1, and shows the mold tilted to the label receiving position.

FIG. 4 is a further schematic side elevational view similar to FIG. 1, and shows the mold returned to its forming position with the web having been advanced to present a new portion thereof for the formation of another cup.

FIG. 5 is a schematic elevational view of the mold, the apparatus for pivoting the mold, and the support for both the apparatus and the mold.

FIG. 6 is a fragmentary vertical sectional view taken generally along the line 6—6 of FIG. 5, and shows the specific mounting of the mold and the relationship between the rack and pinion.

FIG. 7 is a plan view showing the configuration of the cam and its relationship to the rack.

Referring now to FIG. 1, it will be seen that there is illustrated a mold 10 which is carried by a pivot shaft 12 for both axial movement and pivoting or rotational movement about the axis of the pivot shaft 12. The mold 10, which may be a multiple cavity mold both in the transverse and longitudinal dimension thereof, is positioned immediately below the path of a thermoformable plastic web 14 for cooperation with suitable forming means which may include an axial reciprocating plunger 16 to form a cup 18 which remains integral with the web. After each cup or container 18 is formed, the web 14 and the previously formed cups advance to the right where apparatus, not forming a part of this invention and thus not illustrated, fills the cups with a product and then provides the cups with a closure.

In accordance with this invention, there is positioned in each mold cavity a label 20 which surrounds each newly formed cup 18 and forms a part thereof.

This invention particularly relates to the manner in which the label 20 is applied to the cavity of the mold 10.

After the cup 18 has been formed, the mold is shifted axially to clear the cup 18 in a direction away from the path of the web 14. Then the mold 10 is pivoted about the axis of the shaft 12 to a offset position as shown in FIG. 3 which is a label receiving position and at which a label 20 is axially inserted into the mold cavity.

At this time is is pointed out that in the normal operation of the machine the mold 10 will be in an upright position during the forming of a cup and that the axial direction referred to above will be vertical and that the shaft 12 will extend horizontally with the mold being in a horizontal position when it is in the label receiving position. It is to be understood, however, that under certain circumstances the web 14 could be positioned other than horizontally and could be moved other than horizontally, and therefore the terms horizontal and vertical, as well as up and down are not intende to be limiting terms. However, it is much easier to describe and understand the invention when one uses such terms.

After the mold 10 has pivoted about the axis of the shaft 12 to the horizontal receiving position in which the label is conventionally inserted, the mold 10 is ready to assume its vertical forming position of FIG. 1. It is to be noted, however, that during the positioning of the mold 10 to receive a label 20, the web 14 is being horizontally advanced to the right so that when the mold 10 returns to its vertical forming position of FIG. 4, the web 14 has completed its advance and is ready for the molding of another cup or cups.

The principal feature of this invention is illustrated in FIG. 4 wherein, in lieu of the mold being first pivoted back to its upright position of FIG. 2 and then moved axially or vertically to its forming position of FIG. 1, the movement is a compound movement wherein simultaneously with the pivoting of the mold 10 about the axis of the pivot shaft 12, the pivot shaft 12 is moved vertically. Thus, the time required to pivot the mold 10 from its horizontal position of FIG. 3 to its forming position of FIG. 4 is all the time required to return the mold to its forming position. The time required to elevate the mold is thus gained in accordance with this invention, thereby greatly reducing the operating cycle of the apparatus and in a like manner greatly increasing the production rate of the apparatus.

The specifics of the invention are illustrated in FIGS. 5-7. It will be seen that there is a support 22 which is carried by a plurality of vertical extensible support members 24 which serve to move the horizontal support 22 up and down. The support 22 carriers the mold 10 and all of the operating mechanism therefor.

First of all, the support 22 has a pair of upstanding brackets 26 in which opposite ends of the pivot shaft 12 are rotatably journalled. Next, it is to be understood that the pivot shaft 12 may either be formed in two separate sections or may extend through the lower part of the mold 10 and is rigidly affixed thereto. The pivot shaft 12, at one end of the mold 10, is provided with a pinion 28 which is engaged by a rack 30.

There is suitably carried by the support 22 a vertical shaft 32 which carries at its upper end a cam 34 which has a periphery thereof engaged by a cam follower 36 carried by one end of the rack 30. For illustration purposes, there is shown a motor 38 having a horizontal drive shaft 40 which carries a bevel gear 52 which is meshed with a bevel gear 44. The shaft 40 is also illustrated as being provided with actuator means which include an actuator 46 which controls the extensions of the support devices 24 so as to raise and lower the support 22. It is to be understood that the control device 46 will be varied depending upon the type of support devices utilized and may be in the form of a simple switch if the supports are solenoid actuated or may be in the form of a control valve if the support devices 24 are in the form of extensible fluid motors.

While the cam 34 is operative to shift the rack 30 to the left so as to rotate the pinion 28 in a clockwise direction and thus rotate the mold 10 from a horizontal position to a vertical position, it will be seen that the cam 34 is incapable of effecting the pivoting of the mold 10 in a counterclockwise direction to the horizontal label receiving position of FIG. 3. Accordingly, there is provided a drive unit or device 48 for effecting the tilting of the mold 10 in a counterclockwise direction. The drive device 48 is illustrated as being in the form of an extensible fluid motor, preferably a pneumatic motor, which includes a cylinder 50 having a piston 52 mounted therein and dividing the cylinder into chambers 54 and 56. The piston 52 carries a piston rod 58 which is connected to a bracket 60 on the mold.

The chamber 54 is connected by a line 62 to a compressed air source 64 and the line 62 has incorporated therein a valve 66 with a vent 68 so that the valve 66 may alternatively connect the chamber 54 with the pressurized air source 64 or to the atmosphere. The position of the valve 66 is controlled by a second control device 70 which forms part of the aforementioned control means and is also mounted on the shaft 40.

It is to be understood that since the mold 10 offers practically no resistance per se to the pivoting thereof by the drive unit 48, an undue load is placed on the rack and pinion by the drive unit 48 if the action of the piston 52 were not dampened in some manner. Accordingly, the chamber 56 is filled with oil and has a restricted opening 72 through which oil may flow between the chamber 56 and an oil supply 74 through a conduit 76. It is to be understood that the small orifice 72 may be incorporated in the conduit 76 as opposed to being in the wall of the cylinder 50.

Referring now to FIG. 7 in particular, it will be seen that the cam 34 includes a large diameter constant radius portion 78 and a diametrically opposite small diameter constant radius portion 80. The cam has extending between the right ends of the cam portions 78, 80 a lift segment 82 and between the left ends of the cam portions 78, 80 a descent control portion 84. It is to be understood that when the cam follower 36 is engaged with the constant radius portion 78, the mold 10 will be in its vertical position and the dwell of the cam 34 provided by the portion 78 is sufficient to provide the necessary time for a cup forming operation and the downward movement of the mold 10 away from the newly formed cup to the position of FIG. 2. The drive unit 50 is actuated as soon as the mold 10 reaches its lowered position of FIG. 2 so as to tilt the mold 10 in a counterclockwise direction to the position shown in FIG. 3. The restraining portion 84 of the cam 34 serves only to control the descent or tilting of the mold 10.

Once the mold 10 has reached its horizontal label receiving position of FIG. 3, it is maintained in this position by the dwell provided by the constant radius portion 80, which is relatively short in view of the relatively short period of time required to position the label 20 within the mold cavity.

Thereafter, as the cam 34 continues to rotate, the cam segment 82 bears against the cam follower 36 to move the rack 30 to the left, thereby pivoting the mold 10 in a clockwise direction to return it to its upstanding forming position. At the same time the control device 46 actuates the support devices 24 so as to elevate the support 22. It is to be understood that within the time required to pivot the mold 10 from its horizontal label receiving position of FIG. 3 and its upright forming position of FIG. 4, the support 22 is fully elevated. Thus, in a single compound movement the mold 10 is pivoted to its upright position and moved toward the web 14, thereby eliminating a separate axial movement of the mold 10 as occurs during the separation of the mold 10 from the newly formed cup. The time saved is critical and greatly increases the production rate of the machine.

Although only a preferred embodiment of the mounting of the mold and the apparatus for effecting axial and tilting or pivotal movement of the mold 10 has been specifically illustrated and described herein, it is to be understood that minor variations may be made in the mounting of the mold and the actuation apparatus therefor without departing from the spirit and scope of the invention as defined by the appended claims.

I claim:

1. In a method for molding a container from a preform web wherein a label is first inserted in a mold cavity and then the container is formed in the mold, the improvement comprising:

after forming said container in said mold, moving said mold in an axial direction to clear the newly formed container, then pivoting said mold about an axis fixed relative to said mold and extending transversely of said axial direction to a label receiving position, and thereafter pivoting said mold about said fixed axis while moving the mold axially to return said mold in a single compound movement to the position in which said container was formed.

2. A method according to claim 1 wherein when said mold is moved axially means mounting said mold and pivoting said mold are also moved axially.

3. A method according to claim 1 wherein there is a dwell time wherein said mold is fixed both at said forming position and said label receiving position.

4. A method according to claim 3 wherein a container is molded within said mold when said mold is fixed at said forming position and a label is inserted in said mold when said mold is fixed at said label receiving position.

5. In an apparatus wherein a label is inserted in a mold followed by forming a container from a web within the mold with the label being incorporated in the container in surrounding relation, a mechanism for supporting a mold at a forming position and a label receiving position and moving the mold between said positions, said mechanism comprising a support, mounting means mounting said support for movement axially of said mold, pivot means carried by said support for pivoting said mold about an axis fixed relative to said support, and control means for first actuating said mounting means to move said support and said mold axially of said mold away from said forming position to clear the newly formed container, then actuating said pivot means to pivot said mold relative to said support to said label receiving position, and then simultaneously actuating said mounting means and said pivot means to in a single step return said mold to said forming position.

6. Apparatus according to claim 5 wherein said pivot means includes a pivot shaft arrangement carried by said support and extending normal of said axial direction, said mold being carried by said pivot shaft, a pinion connected to said mold and centered on said pivot shaft, a rack engaged with said pinion for rotating said pinion and pivoting said mold, a cam follower carried by one end of said rack, and a cam engaged by said cam follower controlling the position of said rack and thus the tilted position of said mold.

7. Apparatus according to claim 6 wherein said cam is a constantly rotating cam and has constant radius portions defining said forming position and said label receiving position.

8. Apparatus according to claim 6 together with drive means for urging said mold to tilt from said forming position towards said label receiving position with said cam and said rack in combination with said pinion forming means restraining pivotal movement of said mold.

9. Apparatus according to claim 8 wherein actuating said drive means is controlled by said control means.

10. Apparatus according to claim 8 wherein said drive means is a linear fluid motor.

11. Apparatus according to claim 8 wherein said drive means is a linear fluid motor having means restricting the rate of actuation thereof.

* * * * *